United States Patent
Krueger et al.

(10) Patent No.: US 10,657,467 B2
(45) Date of Patent: May 19, 2020

(54) MULTISTAGE CONFIGURATION TREES FOR MANAGING PRODUCT FAMILY TREES

(71) Applicant: BIGLEVER SOFTWARE, INC., Austin, TX (US)

(72) Inventors: Charles W. Krueger, Austin, TX (US); Drew Stovall, Austin, TX (US)

(73) Assignee: BIGLEVER SOFTWARE, INC., Austin, TX (US)

( * ) Notice: Subject to any disclaimer, the term of this patent is extended or adjusted under 35 U.S.C. 154(b) by 0 days.

(21) Appl. No.: 14/136,968

(22) Filed: Dec. 20, 2013

(65) Prior Publication Data
US 2014/0180881 A1 Jun. 26, 2014

Related U.S. Application Data

(60) Provisional application No. 61/740,098, filed on Dec. 20, 2012.

(51) Int. Cl.
*G06Q 10/06* (2012.01)
*G06F 16/26* (2019.01)

(52) U.S. Cl.
CPC ............. *G06Q 10/06* (2013.01); *G06F 16/26* (2019.01)

(58) Field of Classification Search
None
See application file for complete search history.

(56) References Cited

U.S. PATENT DOCUMENTS

| | | | | |
|---|---|---|---|---|
| 5,920,489 | A * | 7/1999 | Dibrino et al. | 716/103 |
| 6,373,488 | B1 * | 4/2002 | Gasper | G06F 16/972 345/427 |
| 6,460,068 | B1 * | 10/2002 | Novaes | 718/102 |
| 6,493,678 | B1 * | 12/2002 | Foster et al. | 705/28 |
| 6,675,157 | B1 * | 1/2004 | Mitchell | |
| 7,480,627 | B1 * | 1/2009 | Van Horn et al. | 705/26.2 |
| 8,374,713 | B2 * | 2/2013 | Srinivasan et al. | 700/106 |
| 2002/0156688 | A1 * | 10/2002 | Horn | G06Q 10/087 705/14.51 |
| 2005/0267889 | A1 * | 12/2005 | Snyder et al. | 707/10 |
| 2006/0100788 | A1 * | 5/2006 | Carrino et al. | 702/19 |
| 2009/0070368 | A1 * | 3/2009 | Callahan | G06F 17/50 |
| 2009/0172024 | A1 * | 7/2009 | Hsu | G06Q 10/10 |
| 2011/0112679 | A1 * | 5/2011 | Srinivasan et al. | 700/107 |
| 2012/0179987 | A1 * | 7/2012 | Mohan et al. | 715/762 |
| 2013/0151315 | A1 * | 6/2013 | Akinola et al. | 705/7.36 |
| 2014/0075004 | A1 * | 3/2014 | Van Dusen et al. | 709/223 |

OTHER PUBLICATIONS http://web.archive.org/web/20090707074846/http://www.biglever.com/demo/GearsSelfGuidedTour.html#SlideFrame_9.*

(Continued)

*Primary Examiner* — Fateh M Obaid
(74) *Attorney, Agent, or Firm* — DuBoie, Bryant & Campbell, LLP; William D. Wiese

(57) ABSTRACT

A product line engineering (PLE) feature modeling structure called a multistage configuration tree that supports the engineering, deployment and maintenance of complex product family trees is provided. Feature selections and downselections are incrementally staged throughout the nodes in a product family tree. Feature decisions made at any node are inherited by all descendants of that node, thereby defining a product family subtree.

2 Claims, 13 Drawing Sheets

(56) References Cited

OTHER PUBLICATIONS

Czarnecki, K., Helsen, S., Eisenecker, U. "Staged Configuration Using Feature Models", Proceedings of the 2004 Software Product Line Conference (SPLC), pp. 266-283, Boston, MA, USA, Aug. 2004.
Hubaux, A., Classen, A., Heymans, P. "Formal modelling of feature configuration workflows", Proceedings of the 13th International Software Product Line Conference (SPLC), pp. 221-230, San Francisco, CA, USA, Aug. 2009.
Bagheri, E., Di Noia, T., Gasevic, D., Ragone, A. "Formalizing Interactive Staged Feature Model Configuration," Journal of Software: Evolution and Process, vol. 24, Issue 4, pp. 375-400, John Wiley & Sons, 2012.
Schroeter, J., Lochau, M., Winkelmann, T. "Multi-perspectives on Feature Models", Proceedings of the 15th International Conference on Model Driven Engineering Languages and Systems, pp. 252-268, Innsbruck/Austria, Sep. 2012.
Reiser, Mark-Oliver, "Managing Complex Variability in Automotive Software Product Lines with Subscoping and Configuration Links", PhD thesis, Technische Universität Berlin, Dec. 2008.
Elsner, Christoph, "Automating Staged Product Derivation for Heterogeneous Multi—Product-Lines", PhD thesis, Friedrich-Alexander-Universität Erlangen-Nürnberg, 2012.
Kang, K.; Cohen, S.; Hess, J.; Novak, W.; & Peterson, A. "Feature-Oriented Domain Analysis (FODA) Feasibility Study" (CMU/SEI-90-TR-021, ADA235785). Pittsburgh, PA: Software Engineering Institute, Carnegie Mellon University, 1990.
Clements, P., Northrop, L. Software Product Lines: Practices and Patterns, Sec 5.5, Addison-Wesley, 2002.

\* cited by examiner

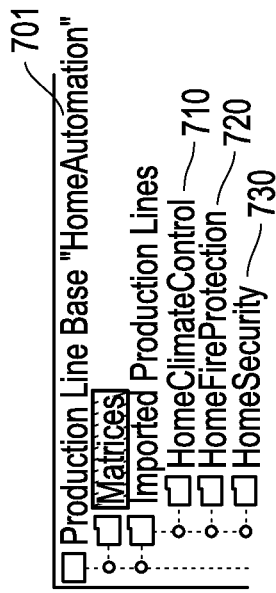

FIG. 7

| ComfortHomeModels | • HomeClimateControl | • HomeFireProtection | • HomeSecurity |
|---|---|---|---|
| CH10 | Manual.Product/ManualSingleZoneHeatCool | $omitted$ | HomeSecurity/OutsideAlarmOnly |
| CH15 | Manual.Product/ManualSingleZoneHeatCool | HomeFireProtection/AudibleAlarmOnly | HomeSecurity/OutsideAlarmOnly |
| CH20 | Automatic.Product/AutoSingleZoneHeatCool | HomeFireProtection/AudibleAlarmOnly | HomeSecurity/OutsideAlarmOnly |
| CH22 | Automatic.Product/AutoDualAllHeatCool | HomeFireProtection/AudibleAlarmOnly | HomeSecurity/AlarmAndPoliceAlert |
| CH25 | Automatic.Product/AutoDualAllHeatCool | HomeFireProtection/EmergencyResponderAlert | HomeSecurity/AlarmAndPoliceAlert |
| CH50 | Automatic.Product/AutoTriZoneHeatCool | HomeFireProtection/EmergencyResponderAlert | HomeSecurity/AlarmAndPoliceAlert |
| CH55 | Automatic.Product/AutoTriZoneHeatCool | HomeFireProtection/AlarmAlertSprinklers | HomeSecurity/AlarmAndPoliceAlert |

FIG. 8

| ComfortHome | • HomeClimateControl | • HomeFireProtection | • HomeSecurity |
|---|---|---|---|
| $templates$ | $unbound$ | $unbound$ | $unbound$ |

MULTISTAGE CONFIGURATION TREES FOR MANAGING PRODUCT FAMILY TREES

PRIORITY STATEMENT UNDER 35 U.S.C. § 119

The present U.S. Utility patent application claims priority pursuant to 35 U.S.C. § 119(e) to U.S. Provisional Application Ser. No. 61/740,098, filed Dec. 20, 2012, entitled "Hierarchical Multistage Binding," naming Charles W. Krueger and Drew Stovall as inventors, which is hereby incorporated herein by reference in its entirety and made part of the present U.S. Utility patent application for all purposes.

TECHNICAL FIELD OF THE INVENTION

The present invention pertains to the creation of a software representation of a portfolio of systems; more particularly, the present invention pertains to the creation of a software representation of a feature-based family tree for a family of similar products or systems.

BACKGROUND OF THE INVENTION

In successful commercial product line organizations, the number and diversity of products deployed can grow to be extremely large, partially due to the efficiencies made available from systems and software product line engineering (PLE) tools and methods. In market segments ranging from industrial pumps to automobiles, it is not unusual for companies to manufacture millions of product instances every year, in thousands of different "flavors."

The extreme scale and scope of diversity in product lines of this size creates significant challenges to engineers implementing the product line, product marketers defining the space of available products, and customers selecting from available products. To provide order and clarity about their product groupings and offerings within this type of complex product space, companies often organize their products into a product family tree, thereby enabling their customers to effectively navigate among the huge number of offerings and to efficiently converge on a suitable product instance.

For example, an automotive manufacturer might hierarchically structure their entire product line portfolio with millions of instances into a family tree with 5 levels:

Platforms. A platform is a family of vehicles of similar size and structure that can be manufactured in the same assembly plant. Examples might be pickup trucks, large sedans, and small coupes.

Programs. A program is subfamily of vehicles within a single platform, known by consumers as the "model" and often found in nameplate display on the back of the vehicle.

Regional programs. A regional program is a subfamily of vehicles within a single program, manufactured for the legislative, geographic, climate, cultural, and marketing characteristics of a particular country.

Trim levels. A trim level is a subfamily of vehicles within a single regional program, representing different tiers of capabilities, accessories, and associated cost. Trim levels are marketed using terms such as base, standard, and luxury.

Vehicle instances. A vehicle instance is a subfamily member within a single regional program trim level. Characteristics of a vehicle instance are determined by the consumer-selectable options available on a particular trim level.

In contrast to the way that the PLE community traditionally focuses on techniques for selecting and solving for features on a particular product instance, product line organization with large family trees expend most of their effort determining which features will not be available within a subfamily. As a result, those skilled in the art are often more focused on identifying the features that they don't want on a particular platform, program or trim package, than on specifying the features they actually want configured on any particular product instance.

SUMMARY OF THE INVENTION

To address this need for managing the feature modeling structure within a product family tree, multistage configuration trees extend the PLE concepts and constructs of feature modeling and staged configuration to support the engineering and deployment of systems and software product line engineering assets for product lines with complex product family trees.

In PLE terminology, a feature model declares the full collection of feature choices available in a product line and a feature profile defines the fully bound collection of feature choices made for a particular product instance in the product line. In multistage configuration trees, the feature model serves as the root of the tree and fully bound feature profiles are found at the leaves of the tree. Partially bound feature profiles, where some feature decisions have been made or restricted and other feature choices remain available, are present either as internal or leaf nodes of the tree.

One of the central properties of multistage configuration trees is that any connected path from the root node to a leaf node must be a monotonically decreasing (i.e., monotonically not increasing) sequence in the space of available feature choices. That is, children must honor the feature decisions made by their ancestors and may optionally decide to make additional feature decisions that further constrain the space of available feature choices. The monotonically decreasing property of multistage configuration trees assures that each node in a tree defines a subfamily, where all descendants of a node inherit the feature decisions from that node and its ancestors.

The addition of multistage configuration trees into PLE, in order to better manage the engineering and deployment of an organization's product family tree, makes possible concomitant capabilities, including (i) the use of partial profiles to perform partial configuration of PLE assets, such as requirements, design models, source code, product documentation, and test cases; (ii) the ability to better manage the evolution of multistage configuration trees; (iii) the use of recursive application of multistage configuration trees to product bundles in hierarchical product lines; (iv) the development of tool automation to support and enforce monotonically decreasing feature spaces; and (v) the automated proliferation of partial profiles into a collection of valid fully bound children The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 7 is a graphical depiction of a hierarchical production line;

FIG. 8 is a graphical depiction of definitions in a matrix of nested product lines;

DETAILED DESCRIPTION OF THE INVENTION

Figure 1:
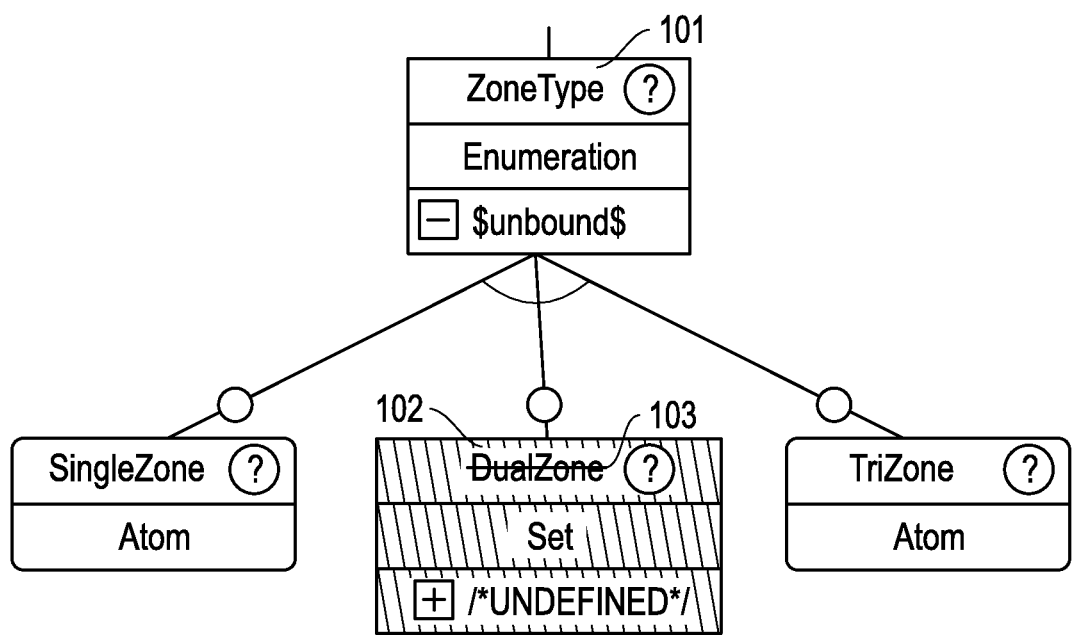
FIG. 1 is a graphical depiction of an unbound enumeration with downselection.

To address this need for managing the feature modeling structure within a product family tree, multistage configuration trees extend the PLE concepts and constructs of feature modeling and staged configuration to support the engineering and deployment of systems and software product line engineering assets for product lines with complex product family trees.

Multistage Configuration Trees

Multistage configuration trees comprise three kinds of models:

Feature models are located only at the root of the tree. As with conventional PLE, a feature model declares the full collection of feature choices available in a product line.

Feature profiles, or fully bound feature profiles, are located only at leaves of the tree. Just like conventional PLE, a feature profile defines the fully bound collection of feature choices made for a particular product instance in the product line. Feature profiles never have children in a multistage configuration tree since no further refinements or feature choices are possible.

Partial profiles, or partially bound feature profiles, are found at internal nodes and leaves of the tree. Partial profiles are a special kind of profile, where you can bind some feature decisions (as in a conventional feature profile), partially restrict the available choices some feature, and explicitly leave other feature choices unbound.

Note that the root feature model in a multistage configuration tree is a degenerate case of a partial profile with no decisions made. A leaf feature profile is another degenerate case of a partial profile with all decisions made.

Partial Profiles

A partial profile is more than just a partially filled out feature profile. There are special modeling constructs and semantics associated with the feature decisions that remain unbound.

In a conventional fully-bound profile, there are two states for each feature decision, undefined and defined. Undefined means that the modeler has not made a decision about a feature, while defined means that the choice for a feature is fully defined.

For partial profiles, there is a third state possible for any feature; unbound. Unbound means that the modeler has explicitly made their decision to leave this decision open, so that other descendants in the multistage configuration tree can make their own—possibly different in different subfamilies—decision about this feature choice.

For feature choices in an unbound state, it is also possible to restrict the space of candidate feature selections through "downselection." Downselection reduces the available diversity for a feature, while still leaving some diversity open in the unbound decision.

The semantics of downselection on the feature types in a feature model will obviously depend on the feature modeling language. Following are representative examples of downselection on the discrete feature types for enumerations, sets, and booleans.

Enumerations. An enumeration is a feature with a discrete, enumerated set of member choices. One and only one member is selected to define an enumeration feature choice. Downselection in an enumeration type feature means removing one or more of the members from consideration. A downselected member can never be chosen as the value for that enumeration.

Sets. A set is a feature with a discrete, enumerated set of member choices. Zero or more members are selected to define a set feature choice. Downselection in a set type feature means removing one or more of the members from consideration. A downselected member can never be chosen as a member of the full bound value for that set.

Inverse to downselection, it is also possible to partially select some of the set members prior to fully defining the value for that feature. A selected member must always be chosen as a member of the fully bound value for that set.

Booleans. A boolean feature is simply a special case of an enumeration, with two members: true and false. Since downselection or partial selection of one of its members would fully determine the value of a boolean, partial selection and downselection is not needed on boolean type features.

FIG. 1 shows an example of a downselection for an enumeration feature type. As indicated visually by the strikethrough 103, the DualZone 102 member of the unbound ZoneType 101 enumeration feature in a partial profile has been downselected and no longer available for inclusion in partial or fully bound profiles in descendants in a multistage configuration tree.

Figure 2:
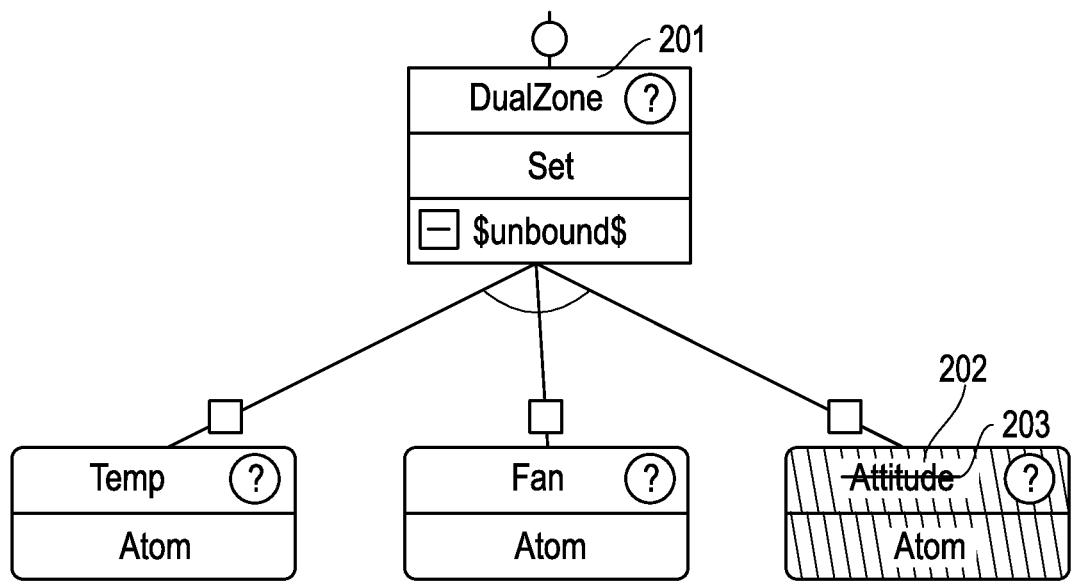
FIG. 2 is a graphical depiction of an unbound set with downselection.

FIG. 2 shows an example of a downselection for a set feature type. As indicated visually by the strikethrough 103, the Attitude 102 member of the unbound DualZone 101 set feature in a partial profile has been downselected and no longer available for inclusion in partial or full bound profiles in descendants in a multistage configuration tree.

Inheritance Rules

The partial profiles and fully bound profiles in a multistage configuration tree are governed by inheritance rules. Feature selections and downselections made at any node in a multistage tree are inherited by all descendants of that node, thereby defining a product family subtree.

The feature decisions—selections, downselections and transitions from unbound to defined—along any connected path from the root node to a leaf node in a multistage configuration tree must be monotonically decreasing. Child profiles inherit and may not override the feature decisions made by their parents and ancestors on the path to the root. Child profiles may optionally decide to make additional feature decisions that further constrain and define the space of available feature choices.

Any profile that defines all remaining unbound feature choices becomes a leaf profile in its multistage binding tree. In theory, a fully defined profile could have a monotonically decreasing child that was identical, but this redundancy is typically not interesting.

The monotonically decreasing property of multistage configuration trees assures that each node in a profile tree defines a subfamily of partially bound and fully bound profiles.

Within a subfamily all descendants of a profile node inherit the feature decisions from that node and its ancestors. These inherited feature decisions determine the commonality of shared feature decisions within the subfamily.

Figure 3:
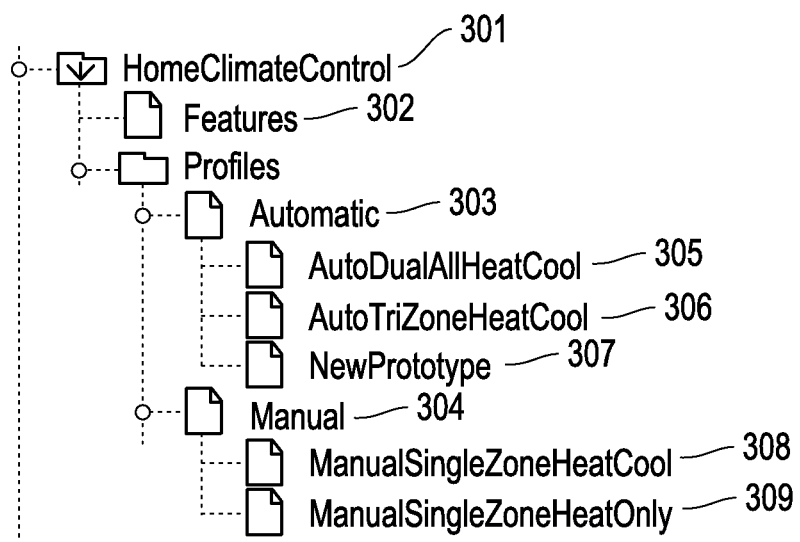
FIG. 3 is a graphical depiction of a multistage configuration tree for Home Climate Control.

FIG. 3 shows a multistage configuration tree for managing a simple HomeClimateControl system in the production line browser. The root of the tree—the feature model—is labeled Features 302. There are two child partial profiles of the root, Automatic 303 and Manual 304, that contain subfamilies for automated home climate control systems and for manually controlled home climate control systems. Within the Automatic 303 family, there are three child members that are fully defined feature profiles: AutoDualAllHeatCool 305, Auto TriZoneHeatCool 306 and NewPrototype 307. Similarly, the Manual 304 family has two child members.

Figure 4:
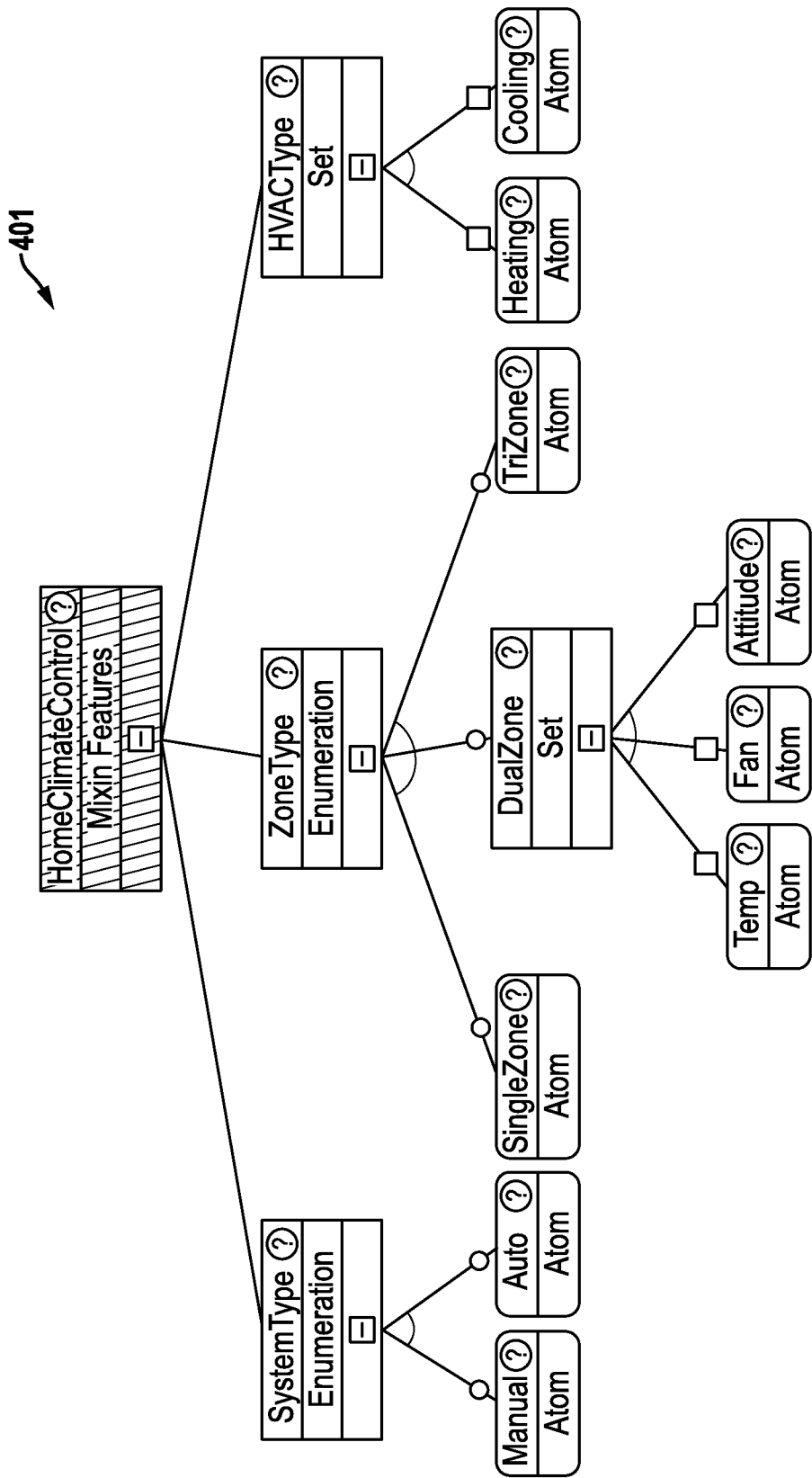
FIG. 4 is a graphical depiction of a feature model.
Figure 5:
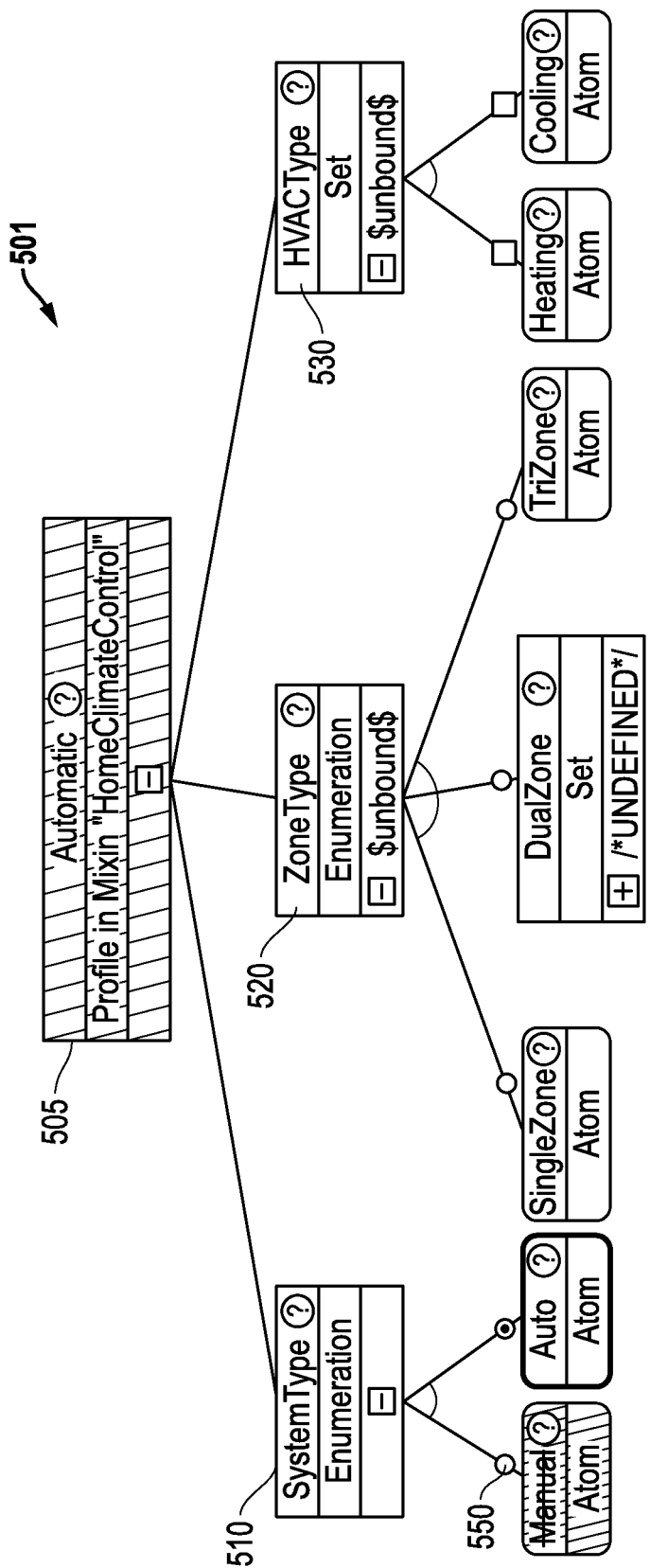
FIG. 5 is a graphical depiction of an automatic partial profile.
Figure 6:
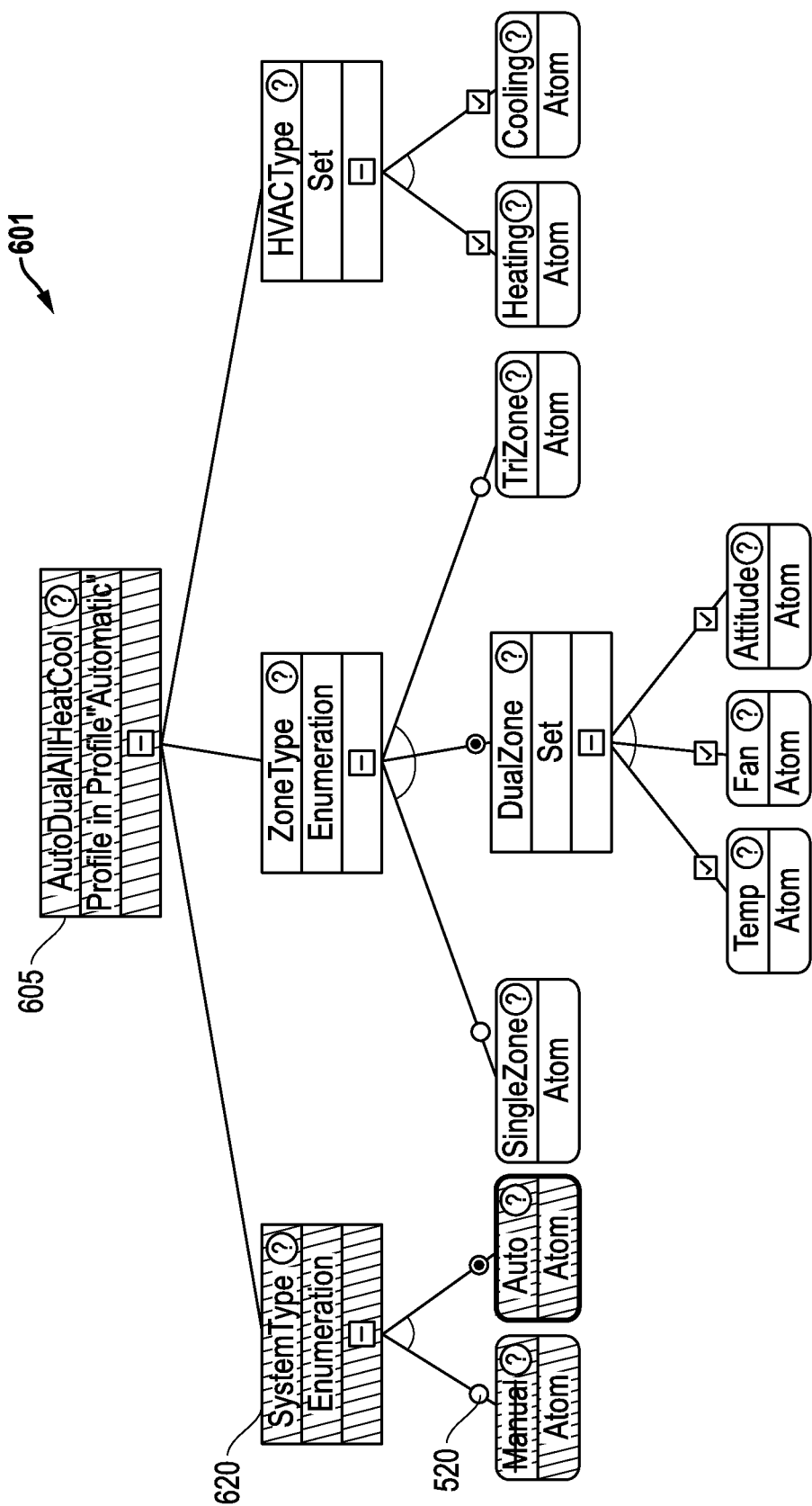
FIG. 6 is a graphical depiction of a fully defined feature profile.

FIGS. 4, 5, and 6 show a monotonically decreasing path in the multistage configuration tree in FIG. 3, starting from the root Feature model 401 in FIG. 4, to the Automatic partial profile 501 in FIG. 5, to the AutoDualAllHeatCool leaf feature profile 601 in FIG. 6.

The feature decision of Auto for the SystemType 510 enumeration in the partial profile 501 in FIG. 5 is inherited by the child profile 610 in FIG. 6, where the SystemType 620 feature and its decision radio button 550 are grayed out to indicate that the decision cannot be changed in the child profile 610 due to the inheritance rules. The Automatic 505 subfamily tree defined by the partial profile 501 in FIG. 5 leaves the decisions about ZoneType 520 and HVAC Type 530 fully unbound, so the full combined space of possibilities from those two features is available in the subfamily.

The AutoDualAllHeatCool profile 605 shown in FIG. 6 fully binds all of the feature decisions left unbound in its parent. Therefore, this profile becomes a fully bound leaf node in the tree.

Figure 16:
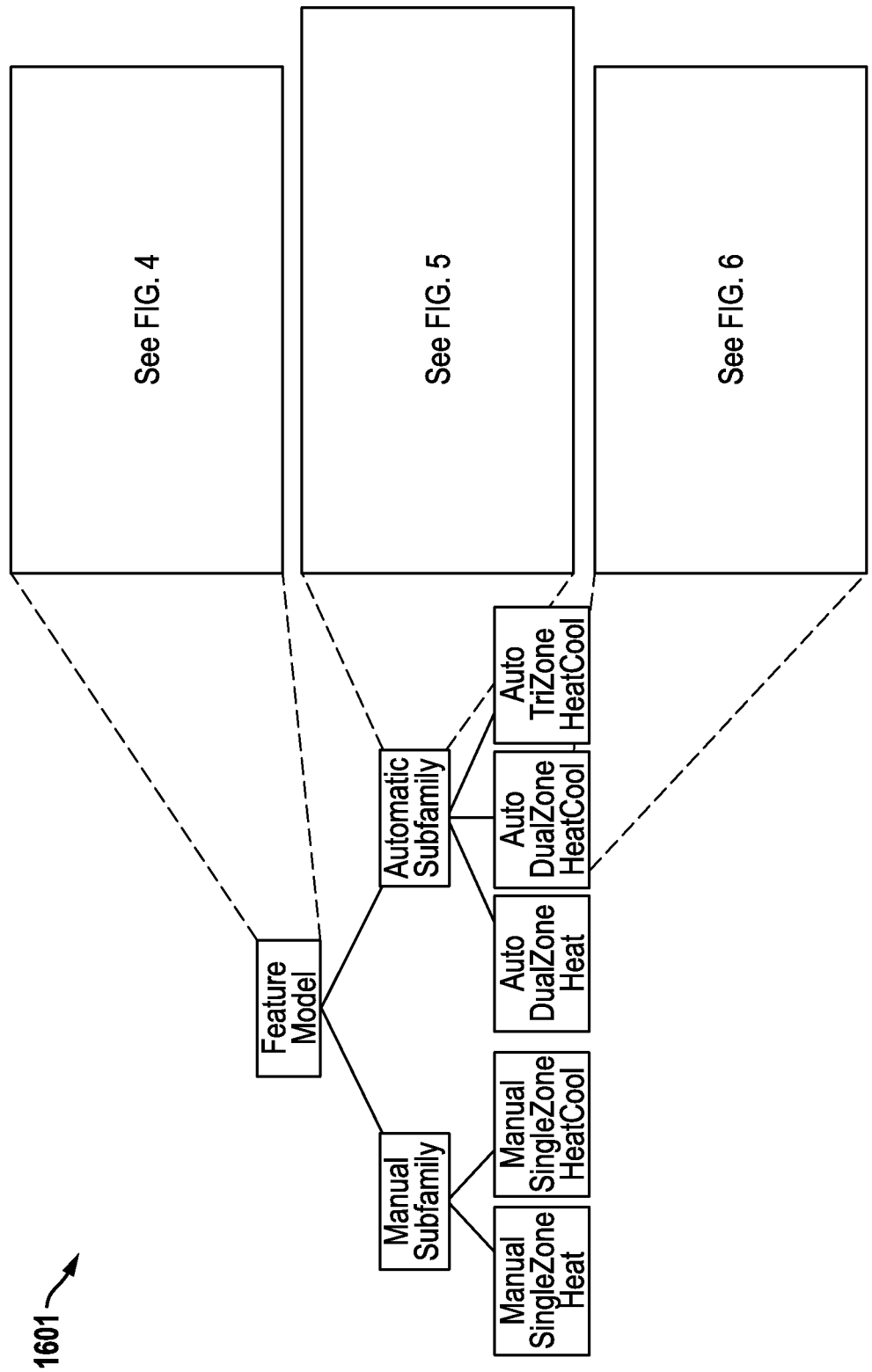
FIG. 16 is a graphical depiction of feature profiles in the context of a product family tree.

FIG. 16 shows the full HomeClimateControl family tree 1601 on the left side of the diagram. The monotonically decreasing path from the root to the AutoDualAllHeatCool leaf is shown in bold branch lines in the tree. The profiles just described in FIGS. 4, 5, and 6 are expanded on the right, shown in the context of the full product family tree.

Product Line Scoping Revisited

Conventional wisdom from the product line engineering literature makes a good argument that when the available feature diversity within a product line is high and the commonality is low, the benefits of leveraging the small amount of commonality during the engineering process may be negated by the overhead of managing the variability. In these cases, the conventional guidance is to split the product line into multiple, smaller and more internally cohesive product lines that each possesses higher ratios of commonality to variability. The drawback of this approach is that after a product line is split into smaller and more cohesive families, these subfamilies become silos that can no longer take disciplined advantage of any commonality that exists among them. It suffers from the classic clone-and-own problem, but in this case for entire product families.

Multistage configuration trees offer an alternative to splitting large and diverse product families into multiple internally cohesive but isolated subfamilies. By keeping the multiple families organized in a multistage configuration tree, cohesive subfamilies can be grouped into subtrees within the same tree.

The multistage subtrees provide the cohesiveness and lower diversity of the smaller subfamilies through appropriate selections, downselections and unbound states in their parents and ancestors in the multistage configuration tree. The commonality among the diverse subfamilies, no matter how large or small, is shared from the common ancestor nodes on the path to the root, thereby avoiding the need to split into independent subfamilies and become divergent through clone-and-own. The benefits become clearly evident in very large product families, where decisions or changes made at higher levels in a multistage configuration tree are inherited by hundreds, thousands, or even millions of subfamilies and product instances.

Multistage Configuration Trees for Product Bundles in Hierarchical Product Line Families One characteristic of PLE is hierarchical product lines—the capability to hierarchically compose larger product lines from a collection of smaller product lines. This is analogous to building a system-of-systems in one-of-a-kind systems engineering, but in this case each system and subsystem is a product line. The result is a product-line-of-product-lines. Multistage configuration trees can also be applied to managing the configuration of these hierarchical product line families.

The application of multistage configuration trees that we've discussed thus far have been applied within the context of a single product line, to structure subfamilies and family members within the product line using a tree of bound and partially bound feature profiles. Hierarchical product lines introduce another mechanism to define a larger granularity product family, but in this case the family is defined in terms of bundles of the different profiles offered by each of the composite product lines in the product line hierarchy. In commercial PLE practice, multistage configuration trees applied to hierarchical product line families is essential in managing very large product lines of this form, such a automobiles which are comprised of approximately one thousand hierarchical subsystems.

At this point, we now have put four hierarchies into play.
feature model trees for a product line
multistage configuration trees applied to feature profiles for a product line
product-line-of-product-line trees
multistage configuration trees applied to hierarchical product line bundles Fortunately, adding the last item in the list and as another hierarchy to the product line methodology is simpler than it might seem. The following example illustrates how multistage configuration trees help significantly with bundling in hierarchical product line families.

Starting with our previous example of the HomeClimateControl system, we add two more product lines, HomeSecurity with different capabilities for intruder detection and alerts, plus HomeFireProtection with different capabilities for fire detection, alerts and suppression. Each of these three product lines is offered in different configurations of features, similar to the product offerings shown for our home climate control system shown in FIG. 3.

To create the product line hierarchy for this example, these three product lines are composed into a larger product line called HomeAutomation. FIG. 7 illustrates this product line hierarchy. HomeAutomation 701 is the root product line and HomeClimateControl, 710 HomeFireProduction 720, and HomeSecurity 730 are nested product lines, indicating their composition in the higher level HomeAutomation 701 product line.

A product marketing role can now define the HomeAutomation 701 products that will be offered to the market as bundles in a product matrix. As illustrated in the matrix 800 in FIG. 8, the products are branded under the name of ComfortHome 805, with model numbers such CH10 810 and CH55 855.

Each product bundle offered at the HomeAutomation 701 level is defined as a named product row in the matrix. The columns correspond to the nested product lines in a bundle and the values selected for each cell in a row are selected from the products offered in each of the nested product lines. For example, in the HomeClimateControl column 802 appear the product offerings described in FIG. 3 and FIGS. 4 through 6.

The drawback of the management of the product line hierarchy in this monolithic listing is the same as the drawback discussed in the first part of this paper for managing a single product line as a monolithic collection of feature profiles. Particularly as the product line gets very large and the list of product bundles in the matrix gets very long, it becomes difficult to express and decipher the families and subfamilies within the space.

For example, in FIG. 8, the ComfortHome 805 product line is divided into 3 cohesive subfamilies for marketing purposes, but the only hint of these subfamilies is a weak naming convention in the left column 801: 10's, 20's and 50's. From the perspective of product marketing, of engineering, and of the consumer, there is no clear way to see or take advantage of the commonalities and better manage the variabilities within this product bundle space.

Applying multistage configuration trees to the definition of hierarchical product lines addresses this deficiency.

Figures 9, 10:
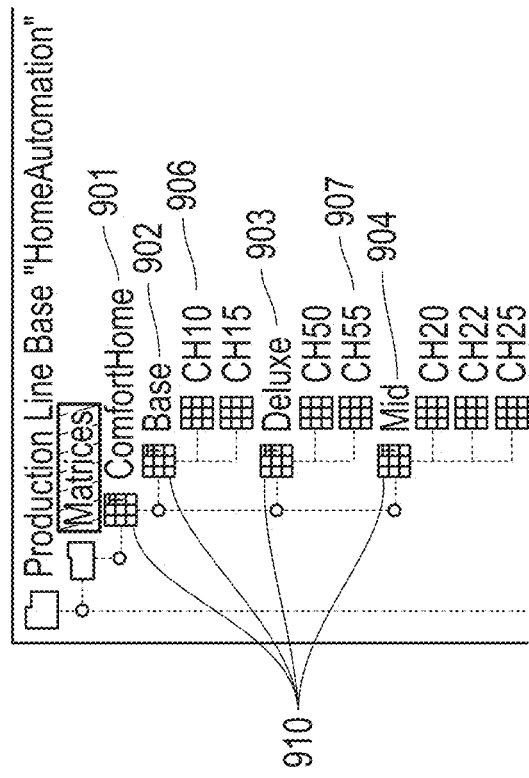
FIG. 9 is a graphical depiction of a multistage configuration tree for a family.
FIG. 10 is a graphical depiction of the root of a multistage configuration tree.

FIG. 9 shows a multistage configuration tree of product bundle matrices, analogous to the multistage configuration tree of feature profiles shown in FIG. 3. Each of the named grid icons corresponds to a product bundle in a single-row matrix, similar to a row in FIG. 8.

The root matrix 901, ComfortHome, will have no decisions bound, analogous to a feature model. The three child matrices below the root, Base 902, Mid 903, and Deluxe 904 group subfamilies and define selections, downselections in their respective matrices that are inherited by all descendants in the subfamily. The fully bound models, such as CH10 906 and CH55 907, are at the leaves of the matrix tree and contain fully bound product bundles.

Note the small 'T' 910 on some of the matrix icons. This indicates a partially bound matrix, meaning that the matrix is a template that contains unbound decisions. Fully bound matrices with all decisions made are shown as grid icons without a 'T' 910.

Following the same inheritance rules as in multistage configuration trees for feature profiles, partially bound product bundles in matrices will be found at internal nodes or leaves in the tree, while fully bound product bundle matrices will be found only as leaves in the tree, with no children.

Figure 11:
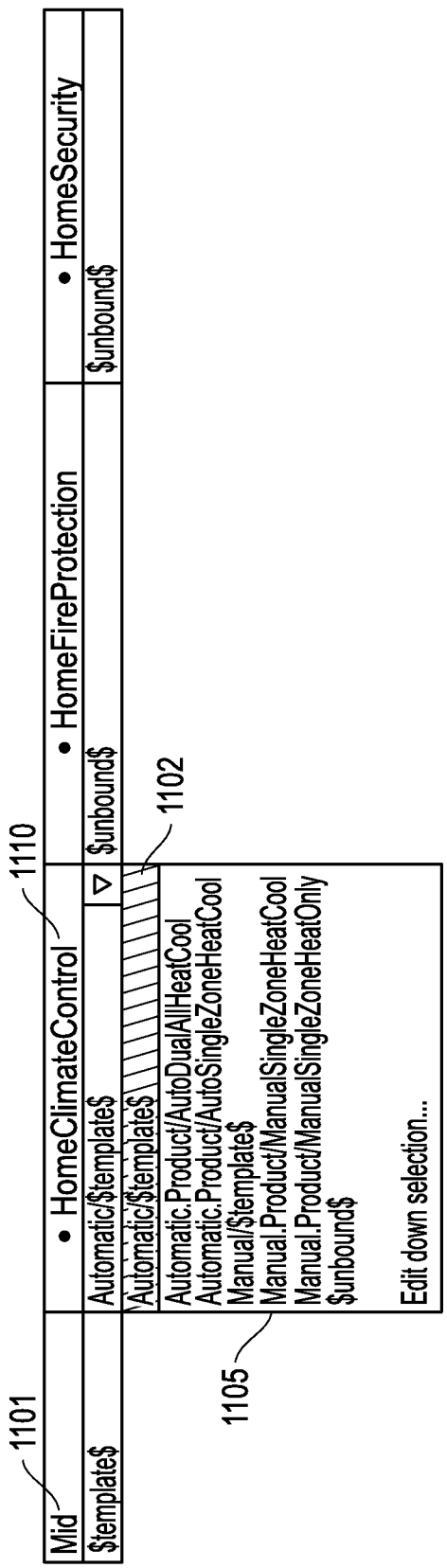
FIG. 11 is a graphical depiction of the selection of a subfamily for a mid partially bound matrix.
Figure 12:
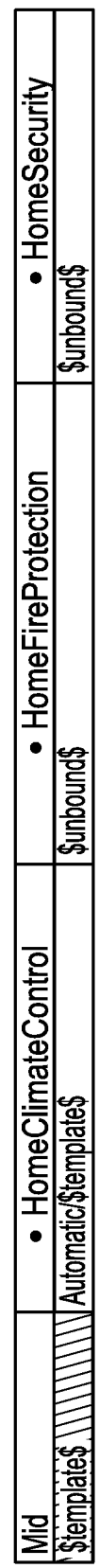
FIG. 12 is a graphical depiction of the mid partially bound matrix.
Figure 13A:
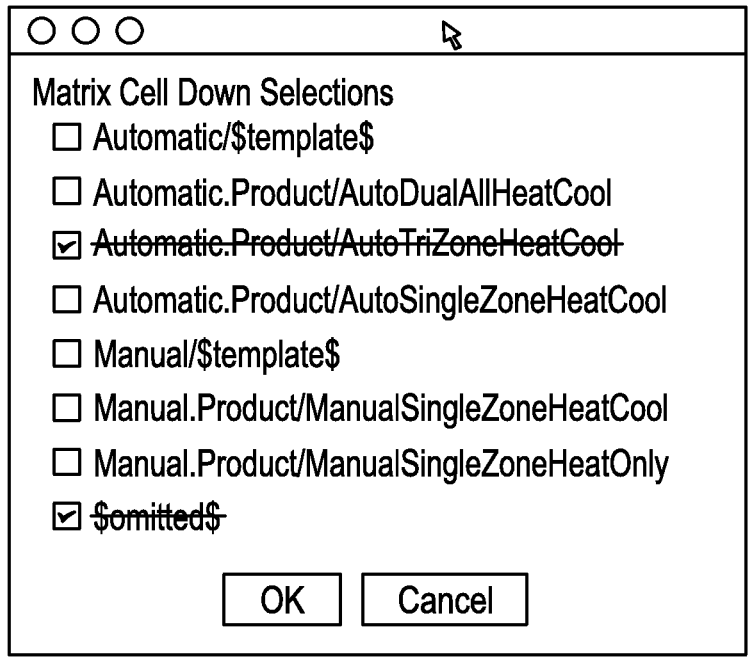
FIGS. 13A, B and C are graphical depictions of the mid downselections.
Figure 13B:
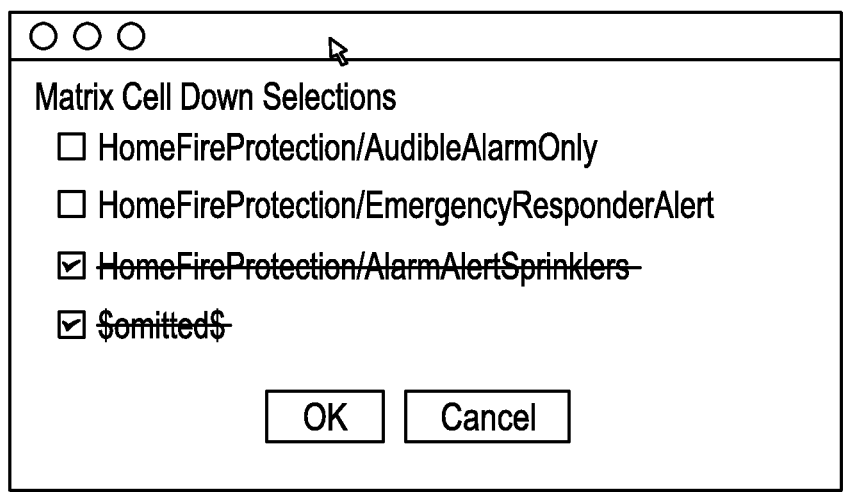
Figure 13C:
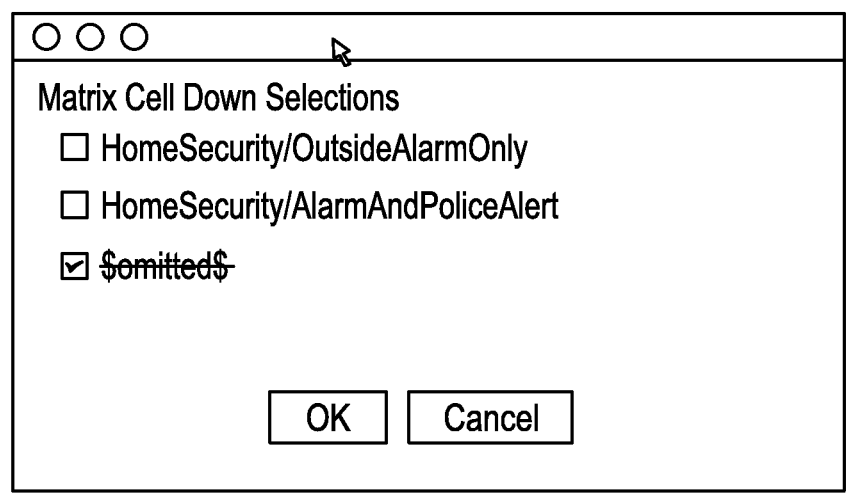
Figure 14:
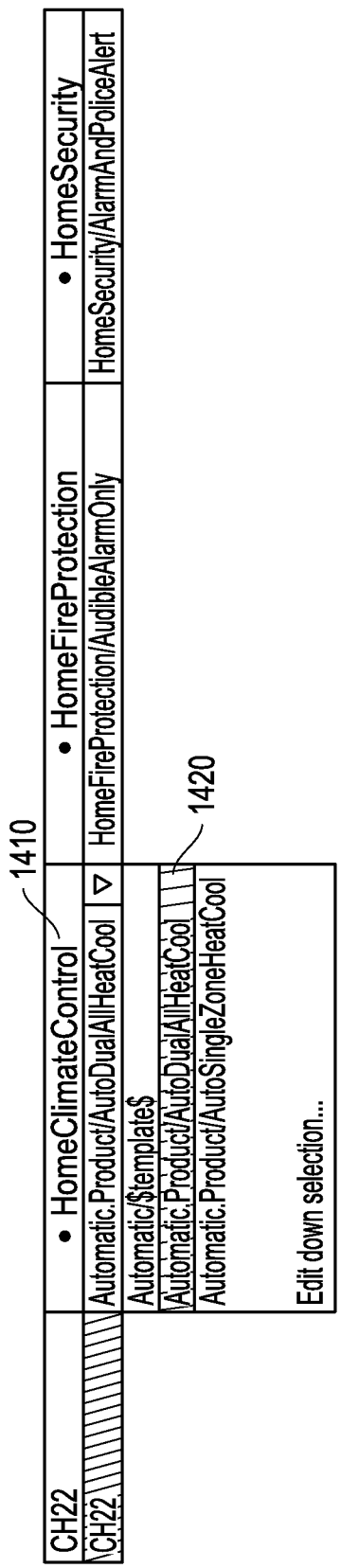
FIG. 14 is a graphical depiction of making a selection for a fully bound matrix.
Figure 15:
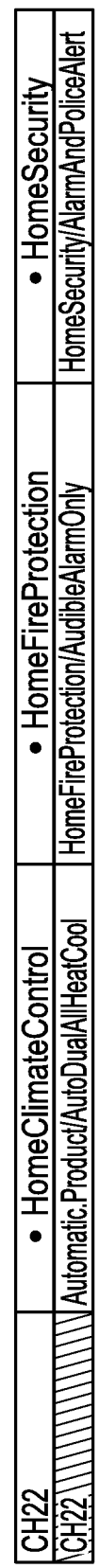
FIG. 15 is a graphical depiction of a fully bound matrix.

FIGS. 10, 12 and 15 show a monotonically decreasing path in the multistage configuration tree from FIG. 9. FIGS. 11, 13 and 14 show intermediate states in this multistage configuration tree of product profile bundles.

Starting with the ComfortHome root matrix 1000 in FIG. 10, all of the decisions remain unbound as seen in the matrix cells for each of the nested product line columns 1001, 1002, 1003.

Moving to FIG. 11, in the Mid partially bound matrix 1101, the pulldown menu 1105 shows the available offerings from the nested HomeClimateControl 1110 product line. The selection being made 1102 is the Automatic subfamily of HomeClimateControl 1110, which will limit future selection in the descendants of the Mid subfamily to only come from the Automatic subfamily of HomeClimateControl 1110. This illustrates an interplay between the multistage configuration tree of the overarching HomeAutomation product line and its subordinate HomeClimateControl product line. FIG. 12 shows the end result after making the Automatic selection.

Downselections in a partially bound matrix bundle eliminate certain choices that are being offered from the nested product lines. FIG. 13A shows the downselections that have been set on the Mid partially bound matrix. The intent of the product marketing role who set these downselections is to express that the midrange products in the product subfamily are constrained to never select from these downselected offerings. For example, in the center downselection dialog for HomeFireProtection in FIG. 13B, two choices 1320 and 1330 have been eliminated for all descendants in the Mid subfamily. Removing the $omitted$ option means that every Mid subfamily member must select one of the available HomeFireProduction options. That is, every Mid product member must provide some form of home fire protection.

Moving to the multistage configuration tree leaf CH22, a fully bound matrix definition, decisions inherited from the Mid parent can be seen in FIG. 14. Because the Automatic 1420 subfamily from HomeClimateControl 1410 was selected in FIG. 11, none of the Manual options are available. Furthermore, the $omitted$ and the Auto TriZoneHeatCool choices were downselected in FIG. 13, so they are not available in the FIG. 14 selectable options for the CH22 product.

FIG. 15 shows the final result of the fully bound CH22 leaf matrix product bundle in the multistage configuration tree.

Figure 17:
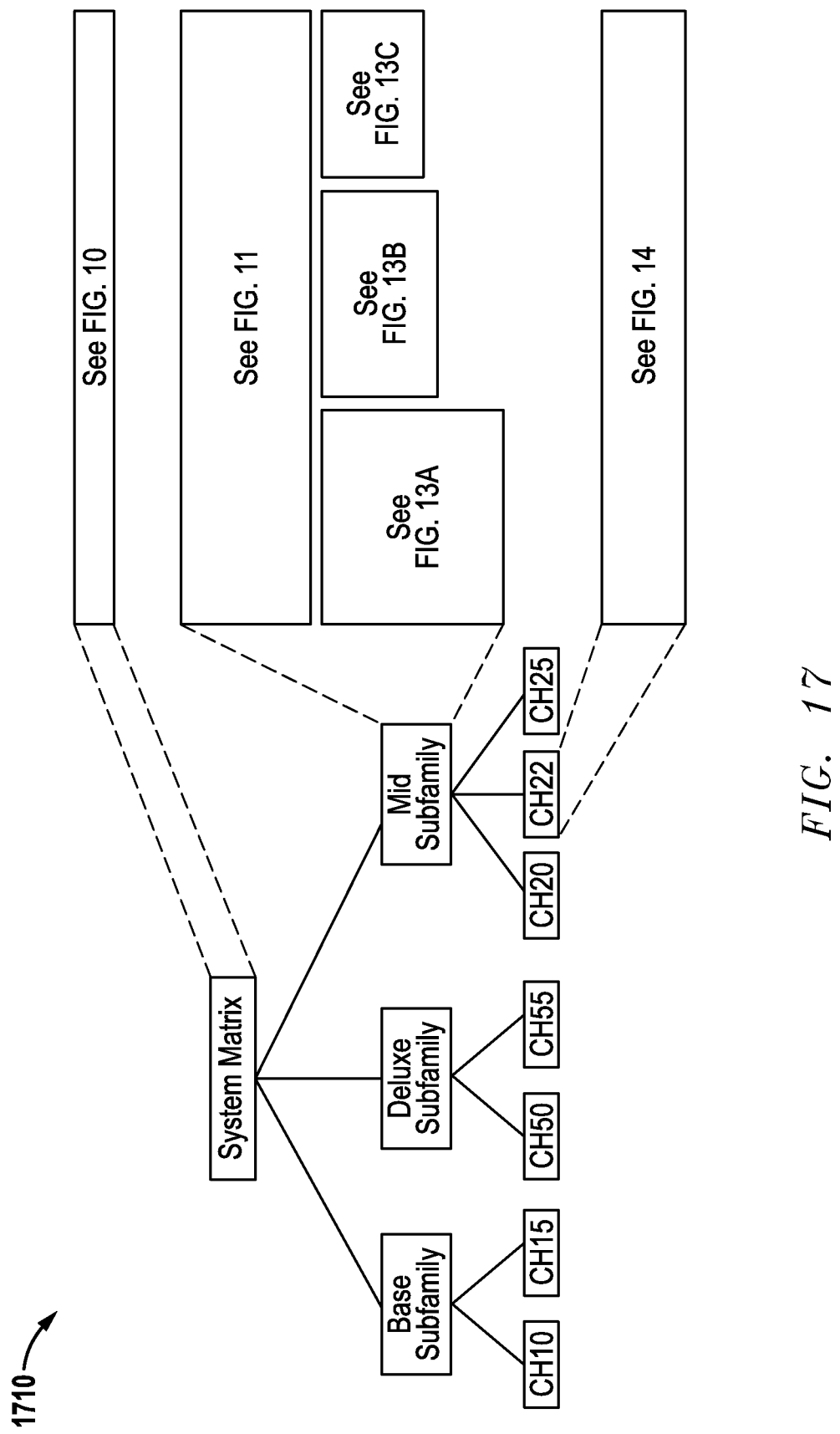
FIG. 17 is a graphical depiction of matrix product bundles in the context of a product family tree.

FIG. 17 shows the full HomeAutomation family tree 1701 on the left side of the diagram. The monotonically decreasing path from the root to the CH22 leaf 1710 is shown in bold branch lines in the tree. The matrix product bundles just described in FIGS. 10 through 15 are expanded on the right, shown in the context of the full product bundle family tree.

Automated Proliferation of Partially Bound Profiles and Partially Bound Product Bundles A partially bound feature profile describes a subfamily possible partial and fully bound profiles. The same thing applies for a partially bound product bundle matrix. A user creating a product family tree might want to fully proliferate all possible descendants of particular partial profile or partial matrix. It is possible to automatically perform this proliferation rather than the user being required to create each one manually. Automated proliferation can utilize PLE feature constrains and other assertions to generate only valid, error free profiles and product bundles.

Evolution of Multistage Configuration Trees

Just like feature models, feature profiles, product profiles, PLE assets, variation points and other constructs in an operational product line, multistage configuration trees are subject to constant evolution to support the ongoing evolution of the product line. Whenever changes are made on the multistage configuration tree constructs in feature models, feature profiles, or matrices, the implications must be considered and propagated across the full multistage configuration tree. As a reminder, the new constructs that have been introduced are (i) unbound states on feature choices and matrix choices, (ii) partial selections in partially bound profiles and matrices, and (iii) downselections in partially bound profiles and matrices Fortunately the inheritance rules in multistage configuration trees provide clear semantics and guidance, as well as opportunity for automated impact analysis and support for interactive refactoring on widespread changes.

The evolutionary changes that need to be supported fall into two categories: reducing the space of variability in a multistage configuration subfamily by constraining available choices and expanding the space of variability in a multistage configuration subfamily by relaxing available choices.

Evolution When Reducing the Space of Variability in a Multistage Configuration Tree The changes that will reduce the space of variability in a multistage configuration tree are:
  changing the state of feature or matrix product bundle choice from unbound to a partially or fully bound selection
  changing a feature or matrix product bundle choice from partially bound to fully bound
  applying additional selections in a partially bound feature or matrix product bundle choice
  applying a downselection to a feature or matrix product bundle choice These changes that reduce the space of variability must conform to the inheritance rules and selections of the ancestors. If the change is made within an internal node in a multistage configuration tree, these tighter constraints need to be propagated down to the descendants in the subfamily. Because the change is narrowing the space of possible variability, some new decisions can be automatically determined and some existing decisions within the subfamily may become invalid. Therefore, automated propagation, semantic checking, and reporting is crucial.

It is also possible to support an interactive option, where the user can incrementally resolve each violation detected during the top-down propagation operation. Any changes made by the user to a node in the multistage configuration tree will recursively invoke the propagation from that updated node, rather than to continue propagating the value from the original ancestor.

Evolution When Expanding the Space of Variability in a Multistage Configuration Tree The changes that will expand the space of variability in a multistage configuration tree are (i) changing the state of feature or matrix product bundle choice from a fully bound to a partially bound or unbound selection, (ii) changing the state of a feature or matrix product bundle choice from a partially bound selection to unbound, (iii) reducing selections in a partially bound feature or matrix product bundle choice, and (iv) removing a downselection on a feature or matrix product bundle choice.

These changes that expand the space of variability must conform to the inheritance rules and selections of the ancestors. If the change is made within an internal node in a multistage configuration tree, the modeler might want the weaker constraints to be propagated down to the descendants in the subfamily. However, because the change is relaxing the space of possible variability, propagation is optional since none of the decisions within the subfamily will become invalid. Automated propagation requires human or heuristic guidance on how to deterministically relax existing choices within the subtree.

Other Considerations for Maintenance and Evolution

The benefit of automated and interactive propagation of evolutionary changes is that a single change to an ancestor node can be easily propagated to hundreds, thousands or millions of subtrees and instances. Of course, as would be affirmed by those skilled in the art, this is also an opportunity for errors and unintended consequences.

Tools and techniques are contemplated that will provide detailed impact analysis and to also support human-guided propagation of changes. An example of the latter include marking nodes that require propagation, but allowing the different owners of these different subfamilies to respond lazily when they have the time, the resources, and the need to do so.

Another alternative would be in the style of code refactoring tools, where the intent of a change could be declared before it was made, so that the tool could both perform the intended change (such as removing a downselection with the intent to also relax all compatible descendants), and then also guide the user or users with specific rationale in the refactoring at each of the candidate update sites during the propagation throughout the descendant subfamilies and family members.

Another example of a common usage scenario with tooling support need is a user traversing up and down a multistage configuration tree, attempting to visualize and comprehend the monotonically decreasing selections and downselections for an individual feature along the path from the root of the family or subfamily tree to a descendant subfamily or individual product. Specific queries and views to display this and other "slices" of information will provide comprehension value to the user.

Partial Configuration of PLE Assets

Supporting partially bound feature profiles and partially bound product bundle matrices as semantically valid constructs in a multistage configuration tree opens the possibility of doing partial configuration of PLE assets. Automated product configuration in PLE is enabled by variation points in the PLE assets that define the mapping from feature selections in feature profiles to the configuration of some encapsulated feature-based diversity in the asset.

There are three conditions to consider for a variation point when performing partial configuration based on partial profiles.

If all feature values referenced by the variation point mapping logic are fully defined, then the variation point can be fully configured;

If none of the feature values referenced by the variation point are defined, then the variation point remains unchanged in the configured asset; and If some but not all of the feature values referenced by the variation point are fully defined, reduction on the mapping logic is required.

In some cases the reduction will fully resolve the mapping, in which case the variation point configuration can be completed. However, in other cases, the reduction will leave the mapping unchanged, in which case the variation remains unchanged in the configured asset. And in other cases, the mapping can be reduced to a simpler form, but the mapping cannot be fully resolved, in which case the variation remains in the configured asset with the simplified form of the mapping logic.

Fully bound matrices and profiles at the leaves of a multistage configuration tree are used to automatically configure assets for product instances. The need and the value of this is clear. Partially bound matrices and profiles in a multistage configuration tree can be used to automatically configure partially bound assets for product subfamilies.

The need and value of this will vary based on the asset type and how an organization uses the asset types in their engineering and business processes. For example, partial configuration of source code that doesn't compile may not be of much interest. However, inspecting a partially configured set of requirements for a subfamily of low-end products and comparing that to a subfamily of high-end products could offer valuable insights about the common and variant properties of those two subfamilies. Unexpected content in the requirements for a subfamily might lead to a refinement in the definition of the product family feature profiles or matrix profiles, or it might indicate a defective mapping for a variation point that needs to be fixed.

While the present method and system have been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of Product line engineering implementations known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A product line management system comprising:
   a product family tree computer data structure, wherein the nodes of the product family tree are feature profiles and each node defines a subfamily;
   one or more partially bound feature profiles in the product family tree, the one or more partially bound feature profiles having some feature decisions that have been made and other feature decisions have not been made, and wherein the one or more partially bound feature profiles are present either as internal nodes or leaf nodes of the product family tree;
   one or more child nodes in the product family tree, wherein the one or more child nodes must inherit, must honor, and may not override feature decisions made by the respective parent of the one or more child nodes, and wherein the one or more child nodes may make additional feature decisions that further constrain the space of available feature choices;
   wherein downselection in a partially bound feature profile constrains the space of available feature choices by excluding from further consideration some feature decisions;
   wherein any direct connected path from a root node in the product family tree to a leaf node in the product family tree is a monotonically decreasing sequence of available feature choices;
   wherein a feature decision or downselection at an internal node in the product tree will be propagated by a computer algorithm to the children of the internal node, and wherein a feature decision or downselection at an internal node in the product tree will stop propagating feature decisions from a parent of the internal node to the children of the internal node and will instead propagate the feature decisions of the internal node to the children of the internal node; and
   wherein creation and modification of the product family tree computer data structure is performed using at least one processor.

2. A method comprising:
   receiving a selection or downselection decision at a profile on a node of a product family tree, wherein each node of the product family tree is a profile and each node defines a subfamily; wherein if the profile is a partially bound profile, then some decisions have been made and other decisions have not been made; wherein if the profile is a fully bound profile, all decisions have been made; therein if the node is a child node, the child node inherits and does not override decisions made by the parent node of the child node;
   downselecting a partially bound profile, thereby constraining the space of available choices by excluding some decisions from further consideration;

decreasing monotonically the sequence of available choices on any directly connected path from a root node in the product family tree to a leaf node in the product family tree;

wherein a decision at an internal node in the product tree will stop propagating changes from the internal node's parent to the children of the internal node and will instead propagate the decision to the children of the internal node; and wherein the creation and modification of the product family tree computer data structure is performed with at least one processor.

* * * * *